ELECTRICAL CONTACT ARRANGEMENTS

Filed Dec. 11, 1963 3 Sheets-Sheet 1

INVENTOR.
HENRI VAN MEINES
BY Charles T. Johnson Jr.
ATTORNEY

Oct. 4, 1966 H. VAN MEINES 3,277,316

ELECTRICAL CONTACT ARRANGEMENTS

Filed Dec. 11, 1963 3 Sheets-Sheet 2

INVENTOR.
HENRI VAN MEINES
BY Charles L. Johnson Jr.
ATTORNEY

ELECTRICAL CONTACT ARRANGEMENTS

Filed Dec. 11, 1963 3 Sheets-Sheet 3

INVENTOR.
HENRI VAN MEINES
BY Charles L. Johnson Jr.
ATTORNEY 3,277,316

ELECTRICAL CONTACT ARRANGEMENTS

Henri Van Meines, Edegem-Antwerp, Belgium, assignor to International Standard Electric Corporation, New York, N.Y., a corporation of Delaware Filed Dec. 11, 1963, Ser. No. 329,839
Claims priority, application Netherlands, May 7, 1963, 292,448; Belgium, Dec. 14, 1962, 626,083
11 Claims. (Cl. 307—88.5)

The invention relates to electrical contact arrangements using control oscillators.

According to the present invention there is provided an electrical control arrangement, which comprises an oscillator to which a control condition may be applied, and a semiconductor controlled rectifier settable to its conductive or its nonconductive condition, dependent on whether said oscillator is or is not caused to oscillate by said controlling condition.

According to the present invention there is also provided electrical control arrangements using control oscillators, in which said oscillators control bistable devices such as controlled rectifiers, serving as electrical contacts.

According to the present invention there is further provided a two-phase generator including two amplifiers associated with a transformer providing regenerative couplings for each of the two amplifiers and delivering output signals in antiphase upon one or the other of the amplifiers being made operative.

Embodiments of the invention will now be described with reference to the accompanying figures.

FIGURE 1, is an electronic telegraph relay which can provide a double current output when fed by a double current (polar) input. The connection of the incoming double current line is represented by connections at 1′ and 2′.

Figure 1:
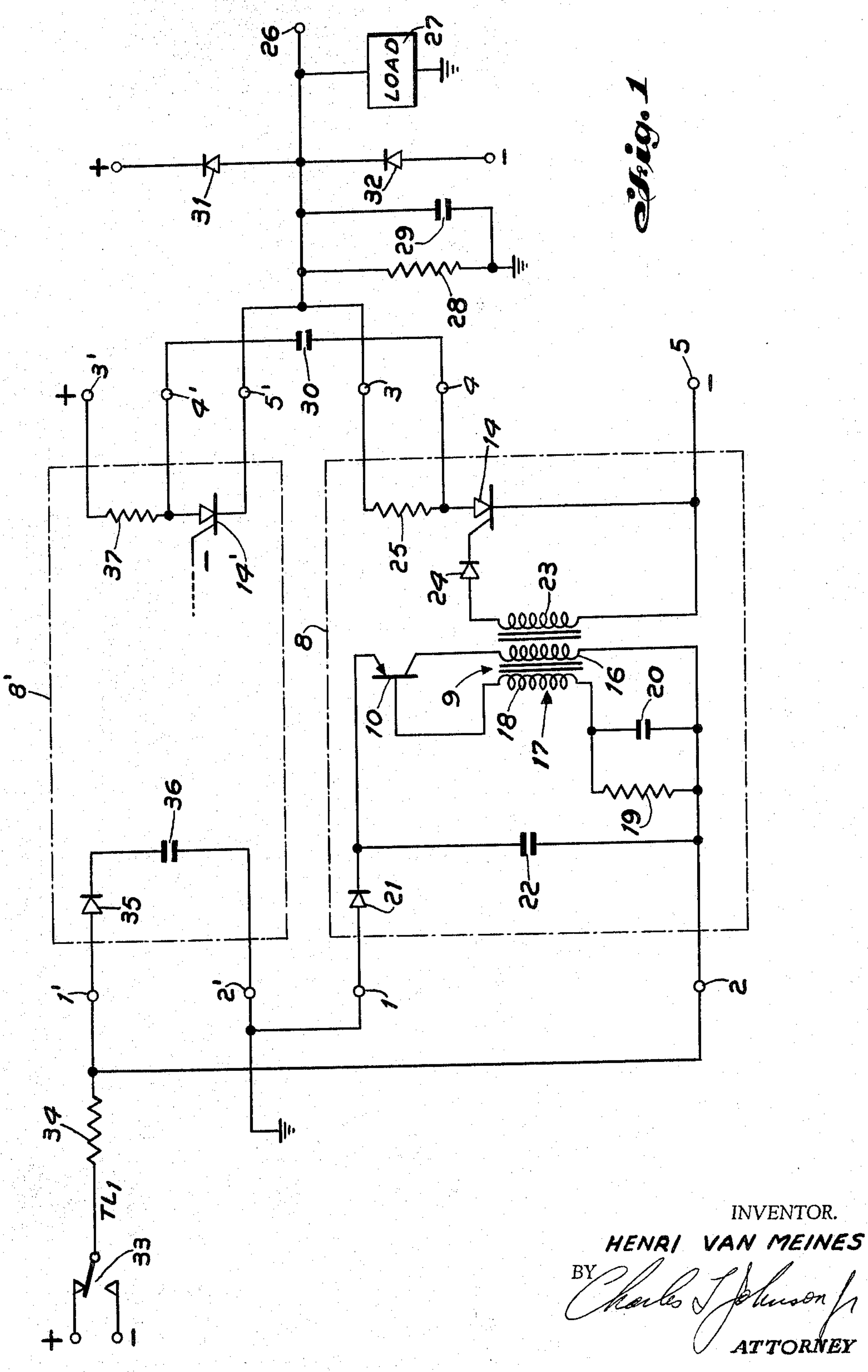
FIG. 1 is a schematic drawing illustrating the invention when used as a double current output telegraph relay.

The electronic telegraph relay comprises two units 8 and 8′ which are identical when fed by a double current line. In view of the similarity between these two units, only 8 has been completely represented in detail, unit 8′ being shown as a block within which only the input and output circuits have been indicated. As shown, unit 8 has two input terminals 1, 2 and three output terminals 3, 4 and 5, the terminals of 8′ being identified by the same numbers provided with primes.

Unit 8, as well as unit 8′, essentially comprises a blocking oscillator 9 whose active element is a PNP transistor 10 and a static switch 12 controled by the oscillator 9. The essential element of the switch 12 is a controlled rectifier 14 which, being bistable, can be either in the blocked condition, or in the low impedance conductive condition.

The blocking oscillator 9 is fed from the outside at terminals 1 and 2, terminal 1 being connected to the emitter of the transistor 10 through diode 21 which is biased in the same direction as the emitter base junction of the transistor. The transistor collector is connected to terminal 2 by means of a first winding 16 of the transformer 17. A second winding 18 of transformer 17 permits oscillator operation and is connected between the base of the transistor 10 and terminal 2. Winding 18 is in series with resistor 19 which is in parallel with capacitor 20. Terminal 2 is also connected to the cathode of rectifier 21 via a capacitor 22 with a rather high value and which is thus in parallel with the oscillator 9. A third winding 23 of transformer 17 permits the provision of an output signal when the oscillator 9 has been triggered after the arrival at terminals 1 and 2 of a current whose direction is such that rectifier 21 conducts. The signal provided by the oscillator 9 is applied between the control electrode of the controlled rectifier 14 and its cathode via a rectifier 24 poled in the same direction as control rectifier 14. As soon as the oscillator begins to oscillate, this signal renders the controlled rectifier 14 conductive. The control rectifier has its cathode directly connected to terminal 5 and its anode connected to terminal 4 and via a resistor 25 to terminal 3. For unit 8, terminal 5 is directly connected to the negative voltage which is generally −60 volts in telegraph systems. Terminal 3 is directly connected to the output terminal 26 of the electronic telegraph relay which is biased towards ground not only through the output load 27 in which the double current will circulate but also by means of resistor 28 shunted by capacitor 29.

When the controlled rectifier 14 is conductive, since resistor 25 has a relatively low value, practically the whole of the negative voltage of −60 volts at terminal 5 appears at terminal 3, the output.

The external connections of the output terminals 3′, 4′, and 5′ of unit 8′ are somewhat different. The controlled rectifier 14′ causes the positive voltage of +60 volts from terminal 3′ to appear at the output terminal 26, via terminal 5′. A capacitor 30 interconnects the terminals 4 and 4′. The two anodes of the controlled rectifiers permits the blocking of one of the two controlled rectifiers 14 or 14′ when the other is rendered conductive.

In accordance with conventional practice the output of the electronic telegraph relay, has a limiter comprising the rectifiers 31 and 32 the cathode of 31 being connected to a positive source and the anode of 32 to a negative source, while their other electrodes are directly connected to the output terminal 26. This, in the case of a mechanical changeover contact, avoids voltage peaks overshooting the + and −60 volts when an inductive load is connected to the output terminal 26 and during the transfer of the changeover contact from one position to the other. In the present case, the electronic changeover contact has a very short transfer time which is one of the advantages of such a contact since it reduces signal distortion.

The operation of the relay will now be described by assuming first of all that it is connected at the input of a line operating with double current, i.e. using the full line connections. The line TL1 connected at its remote end to a changeover contact 33, is connected to unit 8′ so that the changeover contact is connected to terminal 1′ through a resistor 34 to enable the adjustment of the current to the required value, terminal 2′ being connected to ground. Terminals 1 and 2 of unit 8 are connected to terminals 2′ and 1′ respectively. Thus, the two units are in parallel across line TL1 but with the connections crossed so that for the shown position of the changeover contact 33, i.e. when the armature is on the positive pole giving a voltage of +60 volts, the line current renders the input rectifier 35 in 8′ conductive and as soon as the voltage at the terminals of capacitor 36 has reached the value required for the triggering of the oscillator of 8′ the signal produced renders the controlled rectifier 14′ conductive. This connects the positive potential at terminal 3′ to the output terminal 26 via resistor 37 in series with control rectifier 14′. In addition, with contact 33 connected to the positive pole, the input rectifier 21 in unit 8 is blocked and the oscillator 9 of unit 8 is not triggered. The controlled rectifier 14 is blocked.

If contact 33 changes, so that its armature is now connected to the negative pole the situation is reversed. The rectifier 2 conducts so that the blocking oscillator 9 of unit 8 is triggered as soon as the voltage across the terminals of 22 is sufficient to render the controlled rectifier 14 conductive. When rectifier 14 conducts, its forward resistance being negligible, the potential at terminal 4 corresponding to its anode instantaneously passes to a value of −60 volts. While the controlled rectifier 14′ was conductive, terminal 4′ was at a potential slightly lower than +60 volts. The exact value depends on the value of resistor 37 which is low. In this condition, as long as current does not flow in resistor 25, the potential of about +60 volts at terminal 4′, due to the connections between terminals 5′ and 3 and the load resistance of 14′ is also at terminal 4. In other words the capacitor 30 was not charged. When the potential at terminal 4 suddenly drops to −60 volts, when control rectifier 14 conducts, this potential drop instantaneously occurs at terminal 4′ and as capacitor 29 does not permit an immediate modification of the voltage at terminal 5′, the latter remains substantially at about +60 volts. An inverse voltage of about −120 volts is established across recifier 14′ which renders this rectifier nonconductive since at this moment the voltage across capacitor 36 is no longer sufficient to sustain oscillations in unit 8′. The device has thus truly acted as an electronic changeover contact, a voltage of about −60 volts being now brought to the output terminal 26 from the negative potential at terminal 5 and through the series elements 14 and 25.

A reversal of contact 33 will bring back the initial state by an action which is the inverse of that above described. When the positive voltage is transmitted through resistor 34 towards terminal 1′, the oscillator 9 of 8′ is triggered, while that of 8 is blocked, so that the controlled rectifier 14′ conducts. In this case, it is rectifier 14 which is initially conductive and hence the potential at terminal 4, if −60 volts while 14′ was blocked, the potential at terminal 4′ was +60 volts. When 14′ becomes conductive, a corresponding charge of 120 volts occurs across 30. The conductivity of 14′ immediately connects the output terminal 26 and the terminal 4′. Since capacitors 29 and 30 are in series, and the resistance of 14′ is negligible, the potential at the junction points 4′ or 5′, is modified practically instantaneously, to reach a value dependent on the relative capacitances of 29 and 30. In the circuit shown these capacitors are of equal value, but the capacitance of the line connected to output terminal 26 is additional to that of capacitance 29. The potential at 4′ is initially at +60 volts and that at terminal 26 of about −60 volts. Hence the potential at terminal 4′ is suddenly lowered to about 0 volt and hence the potential at terminal 4 suddenly jumps from −60 volts to about −120 volts, so that an inverse voltage of about −60 volts occurs at the terminals to block the controlled rectifier 14. The smaller the capacitance of 30 with respect to 29, the larger the instantaneous voltage drop at terminals 4′ and 4. An inverse voltage for control rectifier 14 up to about 120 volts occurs.

The changeover contact 33 may of course be of the electronic type described and if line TL1 is a bidirectional 4-wire connection, a duplication of the shown equipment will be provided for the transmission in the other direction.

The operation of the electronic telegraph relay when it is fed by a single current line TL2 will now be described by reference to FIGURE 2.

Figure 3:
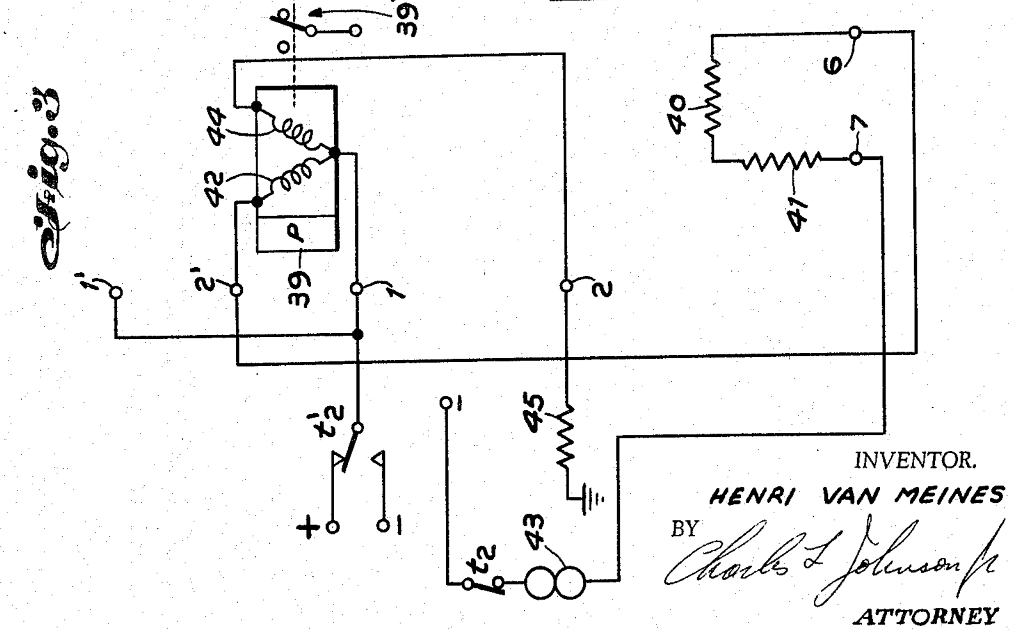
FIG. 3 is a schematic drawing of the single current output telegraph relay using a relay with two windings.

It will be recalled that a classical circuit of this type uses a relay, such as 39 of FIG. 3, with two windings, one of which is transversed by the line curent and the other by a bias current circulating also through a balancing resistance connected to ground. Such a classical arrangement is for instance, described in the U.S. Patent No. 2,557,943 to P. J. Clemens and as explained in this patent, may constitute a half-cord repeater. It may be assumed for instance for this classical circuit as illustrated in FIG. 3 that, the first line winding is connected between terminals 1′ and 2′ instead of unit 8′, that the second bias winding is connected between terminals 1 and 2 instead of unit 8, while terminals 6 and 7 are interconnected by a resistance such as 40 and 41 in series.

In this case, as shown in FIG. 3, considering the connections for the case of a single current line, it is seen that when the armature of contact *t′*2 and pertaining to the relay receiving the signals from a line not shown, is connected to the positive pole of +60 volts, a current circulates through the line winding 42 interconnected between 1′ and 2′ in series with the resistance 40 and 41 between terminals 6 and 7, and the line TL2 towards the negative supply pole via the receiver 43 of the line and in series with the contact *t*2 of the teleprinter. This current is ordinarily adjusted to 40 milliamperes. In addition, current flows from positive contact via potential source *t′*2 to the bias winding 44, connected between terminals 1 and 2, and the balancing resistance 45 connected between terminal 2 to ground. This resistance permits the adjustment of this last current to 20 milliamperes and by assuming that the ampere turns are opposed, the resultant flux for the relay will correspond to a current of 20 milliamperes between the terminals 1′ and 2′, the latter being connected to the positive pole as indicated. This flux maintains the contact 39′ of such a relay in a first position.

When the armature of contact *t′*2 of FIG. 3 is displaced in response to signals received from the line (not shown), since it is now connected to the negative pole, the current in the line TL2 is interrupted, the line being connected to the negative pole at its two ends. Thus there is no longer a current flowing in the winding 42 between terminals 1′ and 2′. On the other hand the direction of the current in the bias winding between terminals 1 and 2 is inversed, the resultant ampere-turns of this relay have not been changed and hence the changeover contact will not be displaced when the armature of *t′*2 is displaced to relay signals to line TL2.

Finally, for the inverse signalling from line TL2 towards the line not shown, and thus by opening of the contact *t*2 with the armature *t′*2 still connected to the positive pole, the interruption of the current in the line winding of the relay connected between terminals 1′ and 2′ leaves only the ampere-turns produced by the bias winding between the terminals 1 and 2 and the direction of these ampere-turns is such that this relay modifies the position of its contact 39 thus relaying the opening of the line TL2.

It will now be explained, with the aid of FIG. 2, how the circuit represented realizes an analogous operation with single current using the described electronic devices and this with the help of the supplementary circuit necessary only in unit 8.

For the represented position of the contacts, the current flowing through the single current line TL2, is in such a direction as to trigger the oscillator of unit 8′ to render 14′ conductive, which brings the positive voltage to the output terminal 26. This current circulating between terminals 1′ and 2′ from the positive pole at contact *t′*2 returns to the negative pole provided through line TL2 by passing between terminals 6 and 7 of unit 8. Entering at terminal 6, part of this current passes through resistor 40 while another part traverses the supplementary winding 50 of transformer 17, diode 51 and Zener diode 52, the whole of this current returning to terminal 7 through resistor 41. That part of the current which goes through diode 51 renders the latter conductive and capacitor 53 connected between terminal 6 and the junction point of diode 51 with Zener diode 52, is now effectively in parallel with the supplementary winding 50 of transformer 17. By choosing the value of capacitor 53 sufficiently high, capacitor 53 practically constitutes a short-circuit across transformer 17. Consequently, when the armature of *t′*2 arrives at the positive source upon the establishment of the current though the path described, before a sufficient voltage is reached across capacitor 22 to trigger the blocking oscillator of unit 8, capacitor 53 will have fulfilled its short-circuiting action across transformer 17 and consequently the oscillator of 8 will not be able to oscillate due to the current brought to terminal 1. This is the current which goes through diode 21 and transistor 10 to return to ground through resistor 45 connected to terminal 2.

When signals are received by the relay controlling the contact *t'*2, the negative source is applied to terminal 1 and current is interrupted through terminals 1'–2' and 6–7 since the two ends of the circuit are at the negative pole. It follows that the oscillator of unit 8' stops oscillating but the controlled rectifier 14' being bistable, remains conductive and still brings the positive voltage to terminal 26. On the other hand, terminal 1 being now connected to the negative pole, rectifier 21 is blocked and consequently the oscillator of the unit 8 cannot be triggered so that the controlled rectifier 14 remains nonconductive. Signalling by contact *t'*2 is without effect upon the state of the electronic changeover contact designed for the transmission towards the station responsible for the operation of *t'*2 while relaying this signalling action towards receiver 43.

Assume the armature of *t'*2 is connected to the positive pole as shown. Upon signalling from line TL2 by the opening of contact *t*2, the current from the positive pole which passes through the armature *t'*2 can no longer flow through the part comprising the terminals 1' and 2', the 8' oscillator stops while current flows between terminals 1 and 2 to return to ground through resistor 45. The oscillator from unit 8 will now be triggered as soon as the fourth winding on transformer 17 is no longer short-circuited by the high value capacitor 53. Indeed, from the opening of contact *t*2 the current flowing through 1'–2' and 6–7 diminishes and when it is insufficient to keep diode 51 conductive, the short circuit across the fourth winding 50 on transformer 17 will disappear. Circuit 51–53 branched across this winding acts as a peak detector and when a small rectified voltage, such as 3 volts, is obtained across 53; rectifier 51 is blocked and capacitor 53 is thus isolated from the winding 50 of transformer 17. At this time the Zener diode 52 is important since with such a diode giving a potential difference at its terminals at least equal to the potential present on capacitor 53, this capacitor is decoupled from any resistance such as 40 and consequently cannot be discharged.

Following the triggering of the oscillator in 8, rectifier 14 becomes conductive. This entails the blocking of 14' as previously explained so that it is the negative voltage at terminal 5 which will now be connected to the output terminal 26 to correspond to the open condition of line TL2. Upon the opening of this line, the oscillator of unit 8' will first cease to function before the current tending towards zero has sufficiently diminished to permit the disappearance of the short-circuit effect across transformer 17 by the elements 51 and 53, so that when the oscillator of unit 8 is activated, that of unit 8' can no longer act on 14'.

When the contact *t*2 is reclosed, the restablishment of the current passing through terminals 1'–2' and 6–7 will first of all suppress the oscillations in 8 and then trigger the oscillator 8' which will again entail the conductibility of the controlled rectifier 14' and hence the blocking of 14.

Figure 2:
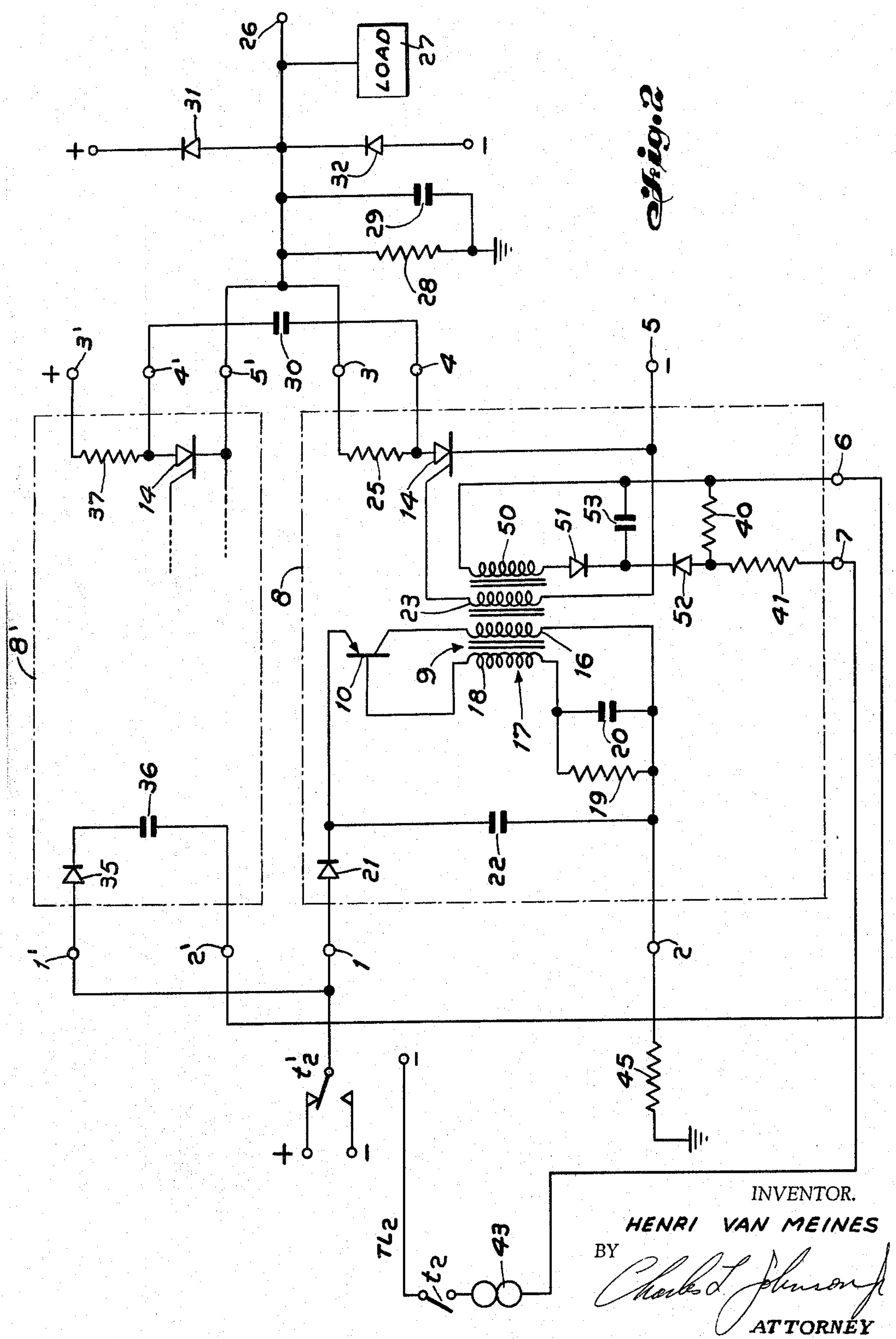
FIG. 2 is a schematic drawing of the invention when used as a single current output telegraph relay.

It is thus seen that the circuit of FIG. 2 with single current in the line TL2 may constitute a half-cord repeater such as described in the above mentioned U.S. Patent No. 2,557,943. Contact *t'*2 can be realized electronically and controlled in the same way as described by a single current or by a double current line.

Although the described means have shown themselves particularly efficient, it is evident that other means could eventually be used to neutralize the oscillator of unit 8 in the described circuit. One could for instance act by saturation of transformer 17 to prevent oscillations. The shunt resistor 40 is not absolutely essential. However it permits diversion of part of the current to render the diode 51 conductive which permits the use of an element of lower power rating. It is also evident that the rectifier 35 in unit 8' is not absolutely necessary when working with a single current system. Oscillators other than blocking oscillators may be used, the former offering the advantage of concentrating energy in a short high amplitude pulse which is particularly well suited to render the controlled rectifier conductive. Bistable elements other than the controlled rectifier may be used. PNPN triodes may be used which can be placed in one state under the action of a positive control pulse and in the other by a negative control pulse. The PNPN triodes could be used in the circuit shown by appropriate crossed connections between the oscillator and such elements, the latter eventually replacing the function of the capacitor 30. If desired, auxiliary pulses could also be used to place the two bistable devices in the blocked condition, the two oscillators being at rest.

Figure 4:
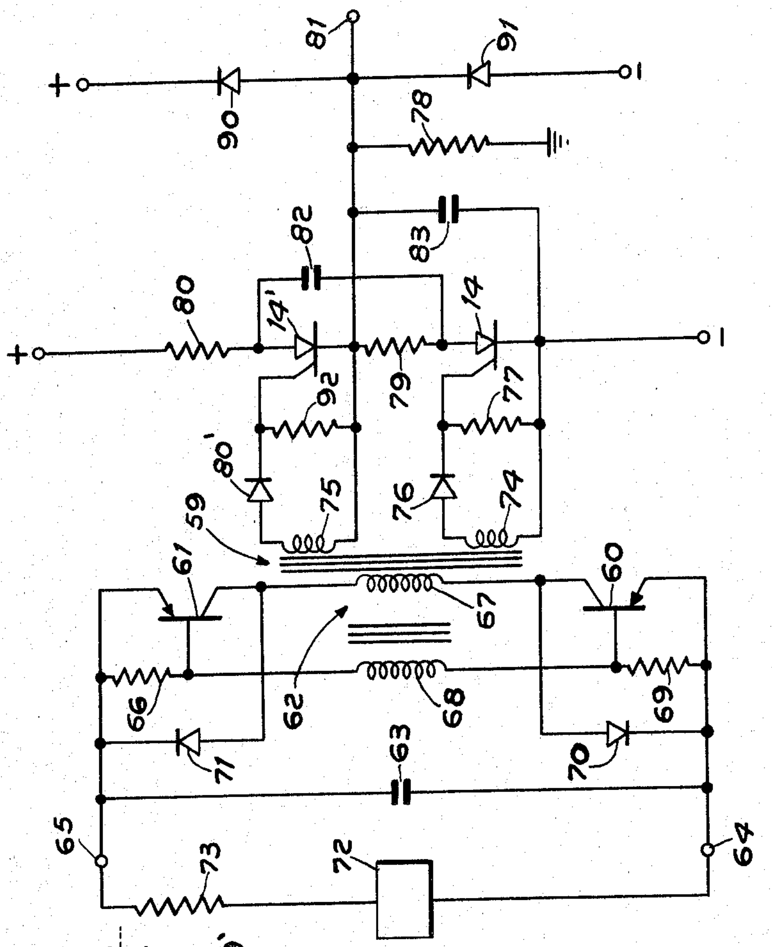
FIG. 4 is a schematic drawing illustrating a two-phase transistorized oscillator using two PNP transistors as active elements.

Referring now to FIGURE 4, the latter shows a two-phase transistorized oscillator 59 using the two PNP transistors 60 and 61 as active elements.

The blocking oscillator 59 formed by the two transistors 60, 61, with transformer 62 and associated components may be used in place of the two separate blocking oscillator units of FIG. 1 when handling double current signals. The need for only one transformer as against the two needed in the arrangement of FIG. 1 is of obvious merit. FIG. 1 has the advantage of more easily dealing with a single current system. In FIGURE 4, the connections to the line are omitted, and in view of the applicability of the circuit of FIG. 4 to telegraph operation, similar reference to those of FIG. 1 are used. As mentioned the circuit shown in FIG. 4 is of the blocking oscillator type and it is powered by a source of energy branched across the input terminals shunted by capacitor 63. The emitter of the PNP transistor 60 is directly connected to the lower input terminal 64 while its collector is coupled to that of the PNP transistor 61 through a winding 67 of transformer 62 which is designed to secure the required regenerative coupling to enable either the transistor 60 or the transistor 61 to operate as an oscillator. The emitter of 61 is directly coupled to the upper input terminal 65. This terminal is also coupled to the lower input terminal by a circuit involving in that order resistor 66, a second winding 68 of transformer 62 and resistor 69, the ends of this second winding 68 being directly connected to the bases of the transistors 61 and 60. Moreover, the emitter-collector paths of both the transistors 60 and 61 are shunted by the diodes 70 and 72 respectively, the cathodes of which are connected to the respective input terminals.

In this manner, upon the application of a voltage source 72 with a series resistance across capacitor 63, when the magnitude of the voltage across 63 becomes large enough, the polarity of the voltage determines whether transistor 60 or transistor 61 will be made operative with the diode 71 or 70 respectively conductive and oscillations will be generated. Assuming that a suitable voltage is present across capacitor 63 with the lower input terminal positive with respect to the upper one, transistor 60 will become operative while diode 70 is blocked. The current flowing out of the collector of 60 and the first winding 67 of transformer 62 returns to the upper input terminal through the conductive diode 71 which effectively short circuits the collector-emitter path of the other PNP transistor 61. On the other hand, transistor 61 will oscillate when the polarity of the input voltage is reversed.

In both cases, oscillatory conditions are produced, but with reversed phases for the signals across the winding of the common transformer 62. By providing a third and a fourth winding on this transformer, said third and fourth windings being oppositely wound, it will be possible to produce output signals which in one case may be used to trigger one bistable element into its ON condition, and in another case, when it is the other transistor which is operative, to trigger another bistable element into its ON condition. As in FIGURE 1, these bistable elements are controlled rectifiers 14 and 14', each of which when conductive, provides an effective connecting path between an output terminal and a point of fixed potential, e.g. ±60 volts in the case of an electronic polar telegraph relay.

Thus, when transistor 60 becomes operative the oscillations developed across the third winding 74 of transformer 68 and more particularly the narrow pulses produced by the blocking oscillator action will be of such a polarity as to render the diode 76 conductive, which diode 76 is serially connected across this third winding 74 with the control path of the controlled rectifier 14. This control path is shunted by a resistor 77 to normalize the effective impedance offered by such a path to the blocking oscillator. Accordingly, with the output terminal grounded via any suitable impedance including the load and allowing the flow of D.C., such as resistor 78, the controlled rectifier 14 whose anode is coupled to the output terminal through low resistor 79 and whose cathode is connected to negative permits a flow of current through resistor 79 in series with the main path of 14. The latter rectifier was made conductive by the blocking oscillator action of transistor 60.

Assuming that the polarity of the operating voltage across the input terminals is reversed so as to cause transistor 61 to become operative when the voltage across capacitor 63 is large enough, the voltage developed across the fourth winding 75 of 62 will have the required polarity to make diode 80' conductive whereas diode 76 will be blocked. Accordingly, it is the controlled rectifier 14' which will now be made conductive allowing a flow of current from positive battery through resistor 80 and the main path 14' to the output terminal 81.

As already described, upon 14' being triggered into the conductive condition at the moment that 14 is already conductive, the output terminal 81 which is now at a potential of about −60 volts will be suddenly connected through 14' to the upper terminal of capacitor 82 which is at that moment initially at a potential of about +60 volts, whereas its lower terminal is at a potential of about −60 volts by virtue of control rectifier 14 being still conductive. Due to this sudden interconnection, the potential at the output terminal 81 will quickly assume a potential value which is intermediate between these two values of −60 and +60 volts. For instance, if the capacitances of 82 and 83 are equal, this output potential will quickly pass from 60 to about 0 volt. The potential across 82, neither plate of which is directly connected to a fixed potential, is still at about 120 volts. The sudden change of about +60 to 0 volt at the anode of rectifier 14' will cause a sudden change from about −60 to about −120 volts at the anode of rectifier 14. Since the cathode of 14 is fixed at −60 volts, the controlled rectifier 14 will be suddenly blocked. Thereafter, the capacitor 83 which was initially discharged and which was suddenly charged to 0 volt at its upper plate, with its lower plate connected to the fixed potential of −60 volts, will be rapidly charged through the low valued resistor 80 and the conductive rectifier 14' so that the output potential rapidly passes to the new desired value of +60 volts. This corresponds to 14' being conductive, whereas on the other hand capacitor 82 is rapidly discharged through 14' in series with resistance 79. But, during these rapid changes, since the lower plate of capacitor 83 is directly connected to the −60 volts terminal, this source of potential which has its other pole grounded is not at any time loaded merely by the two capacitors 82 and 83 in series with the control rectifiers 14 and 14'. Any current flowing at that instant through this negative battery source must necessarily flow through the load resistance 78 which may therefore serve to limit the current through the negative battery source.

The rectifiers 90 and 91, having the anode of 90 and the cathode of 91 connected to the output terminal 81 while the cathode of 90 and the anode of 91 are connected to the positive and negative supply poles respectively, serve to limit the potential variations at the output terminal in the well known manner.

If, with the controlled rectifier 14' conductive, the potential across the input terminal is again changed so that the lower terminal is again positive to the upper one, transistor 60 will again be made operative whereas 61 will cease to oscillate and accordingly the controlled rectifier 14 will be triggered. Upon 14 being made conductive, the potential at the lower plate of the uncharged capacitor 82 which was about +60 volts is now suddenly brought down to −60 volts. Accordingly the potential at the upper plate of capacitance 82 will also drop from +60 volts to about −60 volts with the result that the anode of 14' being suddenly brought down to about 120 volts lower than its cathode potential, this controlled rectifier 14' is suddenly blocked. This potential at the output terminal rapidly passes again to about −60 volts due to capacitor 83 being discharged through rectifier 14 and resistance 79 in series, while capacitor 82 is again charged to about 120 volts through rectifier 14 and resistor 80 in series.

For the circuit shown in FIGURE 4, illustrative design values for some of the various components are as follows:

Resistors 66, 69=10,000 ohms
Resistors 79, 80=100 ohms
Resistor 78=3,900 ohms
Resistors 77 and 92 are dependent upon the type of controlled silicon rectifiers 14 and 14' which are used.
Capacitors 63, 82 and 83=0.47 microfarad While the arrangement described above is especially advantageous for operation as an electronic polar telegraph relay particularly from a double current line which will produce the potential reversals at the input terminals across capacitor 63, it is evident that the arrangement may be used for other applications and particularly whenever reversals of the polarity of the D.C. voltage feed may be secured.

While the principles of the invention have been described above the connection with specific apparatus, it is to be clearly understood that this description is made only by way of example and not as a limitation on the scope of the invention.

What I claim is:

1. A bistable switch arrangement, in which there are first and second D.C. potential sources with a common terminal, in which the two uncommoned terminals of the two D.C. sources are joined through a series circuit comprising a first resistance, a first bistable switch device, a second resistance and a second bistable switch device in that order, in which a first capacitance is connected across the series combination of said first bistable switch device and said second resistance, in which a shunt combination of a second capacitance and a load impedance is connected between the junction of said first bistable switch device with said second resistance and the common terminal of said D.C. sources.

2. A two-phase generator including two amplifiers associated with a transformer providing regenerative couplings for each of the two amplifiers and delivering output signals in antiphase upon one or the other of the amplifiers being made operative, in which a first pair of terminals one from each of said amplifiers are interconnected through a first winding of said transformer, in which a second pair of terminals one from each of said amplifiers are interconnected through a second winding of said transformer, in which a third pair of terminals from each of said amplifiers are coupled to a source of energy to power said amplifiers, and in which for each of said amplifiers means are provided to separately shortcircuit those terminals of said first and third pairs which are associated with a same amplifier.

3. A generator as claimed in claim 2, in which said shortcircuiting means comprise asymmetrical resistances while said amplifiers are transistors, each said asymmetrical resistance being connected in shunt across the emitter-collector path of the associated transistor and with an opposite polarity both for each asymmetrical resistance with respect to its associated transistor and for the two asymmetrical resistances with respect to said source of energy.

4. A bistable switch arrangement, in which there are first and second D.C. potential sources with a common terminal, in which the two uncommoned terminals of the two D.C. sources are joined through a series circuit comprising a first resistance, a first bistable switch device, a second resistance and a second bistable switch device in that order, in which a first capacitance is connected across the series combination of said first bistable switch device and said second resistance, in which a second capacitance is connected across the series combination of said second resistance and the second bistable switch device, and in which a load impedance is connected between the junction of said first bistable switch device with said second resistance and the common terminal of said D.C. sources.

5. An electrical control arrangement comprising oscillator means, control condition signal means operatively connected to the oscillator means to provide a signal for controlling the oscillator means according to predetermined conditions, and semiconductor controlled rectifier means including at least two semiconductor controlled rectifiers settable to conductive or nonconductive conditions, dependent on whether said oscillator means is or is not caused to oscillate by said controlling condition wherein the oscillator means includes two oscillators controllable by said control condition, said control condition rendering the first to oscillate when it has one polarity and the second oscillator operable when it has another polarity, the two semiconductor controlled rectifiers having a common output terminal and operatively connected to two voltage sources, the semiconductor controlled rectifiers conductive or nonconductive condition being controlled by the oscillating or nonoscillating condition of the said first and second oscillators so that when said first semiconductor controlled rectifier is in its conductive condition it connects a source of voltage of one polarity to an output terminal and in which when said second semiconductor controlled rectifier is in its conductive condition it connects a source of the other polarity to said output terminal.

6. An electrical control arrangement as claimed in claim 5, in which the said oscillator means includes a blocking oscillator having first and second active elements, either one of which can be rendered operative to the exclusion of the other, dependent on the polarity of said controlling condition.

7. An electrical control arrangement as claimed in claim 6, in which said first semiconductor controlled rectifier is rendered conductive when said first active element is rendered operable, and in which a second semiconductor controlled rectifier is provided which is rendered conductive when said second active element is rendered operable.

8. An electrical control arrangement as claimed in claim 7, in which when said first semiconductor controlled rectifier is conductive it connects a source of voltage of one polarity to an output terminal and in which when said second semiconductor controlled rectifier is conductive it connects a source of voltage of the other polarity to said output terminal.

9. An electrical circuit as claimed in claim 5, in which each said control arrangement includes an individual rectifier associated with its respective input, the two rectifiers being oppositely poled so that when a source feeding both circuits has a first polarity, one oscillator is triggered while the other is not and that these conditions are reversed upon a polarity reversal of said source.

10. An electrical circuit as described in claim 5 wherein said outputs comprise a resistance in series with the main current path of the bistable device and the junction points of this resistance with the corresponding bistable device are connected to one another through a capacitor in order to render one of the bistable devices blocked when the other is rendered conductive and vice versa, by the transmission of a blocking pulse through said capacitor.

11. An electrical circuit comprising two arrangements comprising control blocking oscillators and bistable devices in which said blocking oscillators control the bistable devices which act as electrical contacts, in which the inputs feeding the two oscillators are inserted in two respective circuits each fed by a source of energy, and in which their respective outputs are series coupled between a first and a second potential, a load being coupled between the two outputs on the one hand and a third potential on the other.

References Cited by the Examiner

UNITED STATES PATENTS

| | | | |
|---|---|---|---|
| 3,119,058 | 1/1964 | Genuit. | |
| 3,128,396 | 4/1964 | Morgan | 307—88.5 |
| 3,155,777 | 11/1964 | Owen. | |
| 3,176,159 | 3/1965 | Laishley | 307—88.5 |
| 3,183,430 | 5/1965 | Schonholzer | 307—88.5 X |
| 3,189,782 | 6/1965 | Heffron | 307—88.5 X |

FOREIGN PATENTS

| | | |
|---|---|---|
| 940,306 | 10/1963 | Great Britain. |

ARTHUR GAUSS, *Primary Examiner.*

I. C. EDELL, *Assistant Examiner.*